Jan. 7, 1936.  W. A. EDWARDS  2,026,675
METHOD AND APPARATUS FOR CONTROLLING PHOTOGRAPHIC EXPOSURES
Filed April 2, 1935   3 Sheets-Sheet 1
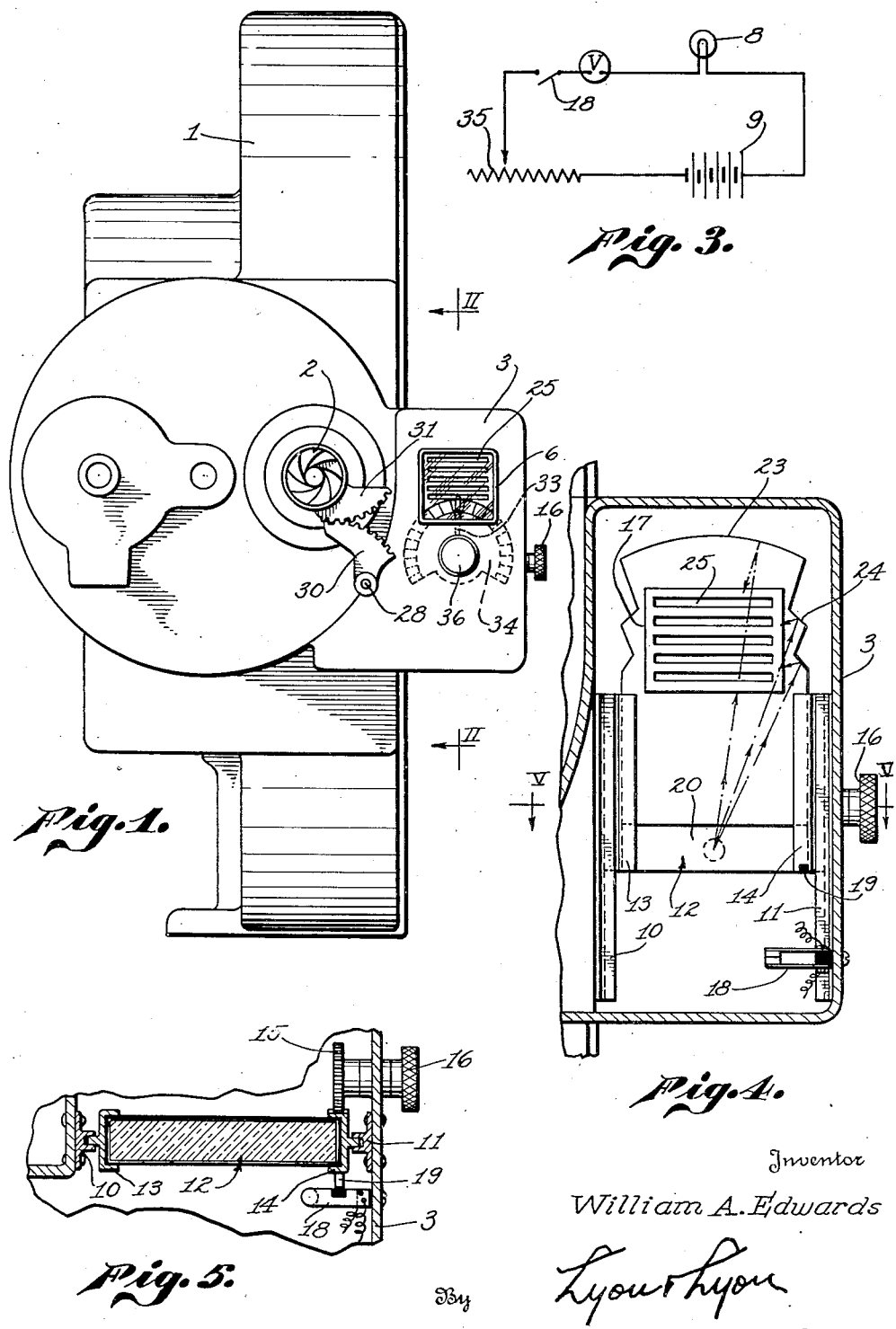
Inventor
William A. Edwards
By Lyon & Lyon
Attorneys Jan. 7, 1936.  W. A. EDWARDS  2,026,675
METHOD AND APPARATUS FOR CONTROLLING PHOTOGRAPHIC EXPOSURES
Filed April 2, 1935  3 Sheets-Sheet 2
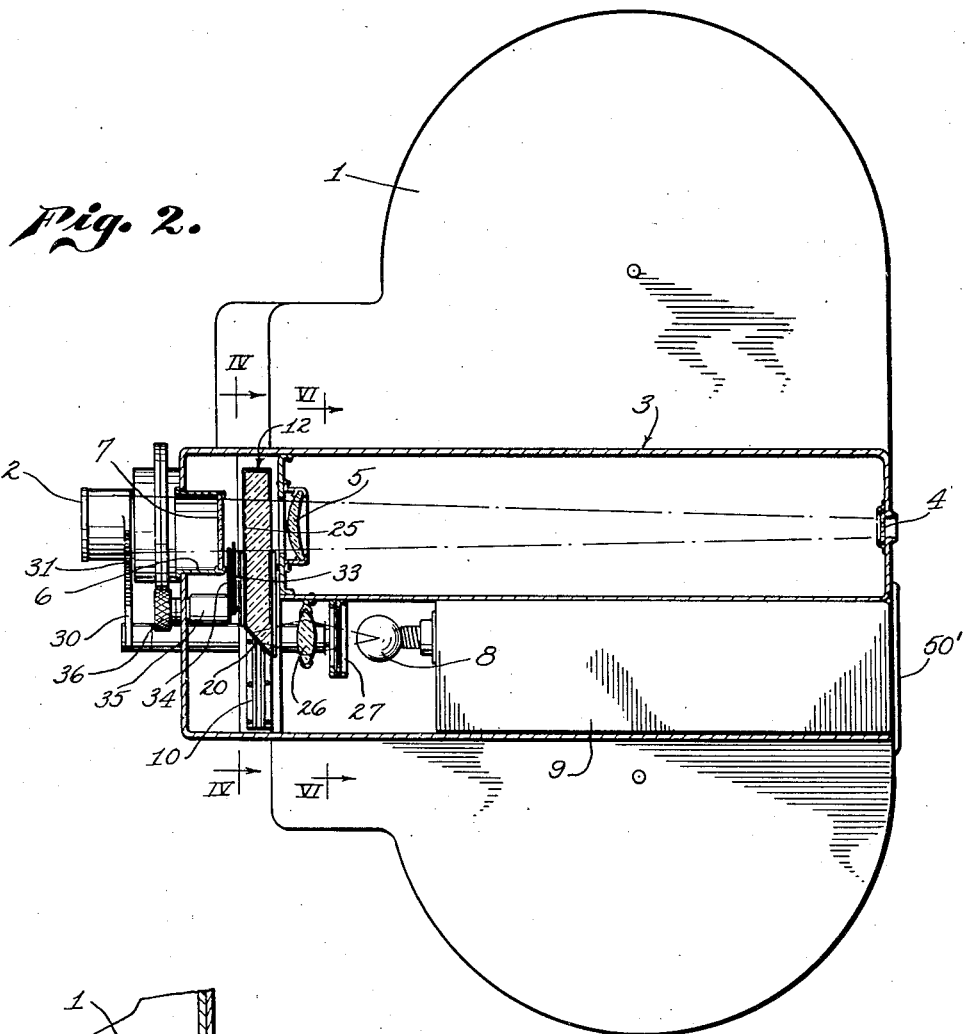
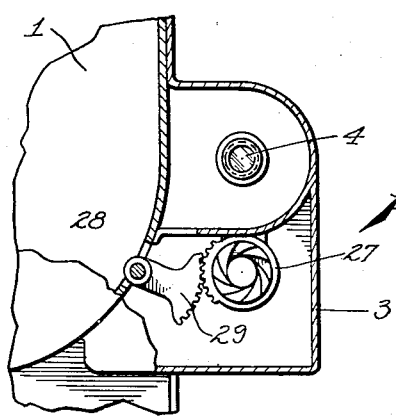
Inventor
William A. Edwards
By Lyon & Lyon
Attorneys Jan. 7, 1936.  W. A. EDWARDS  2,026,675
METHOD AND APPARATUS FOR CONTROLLING PHOTOGRAPHIC EXPOSURES
Filed April 2, 1935  3 Sheets-Sheet 3
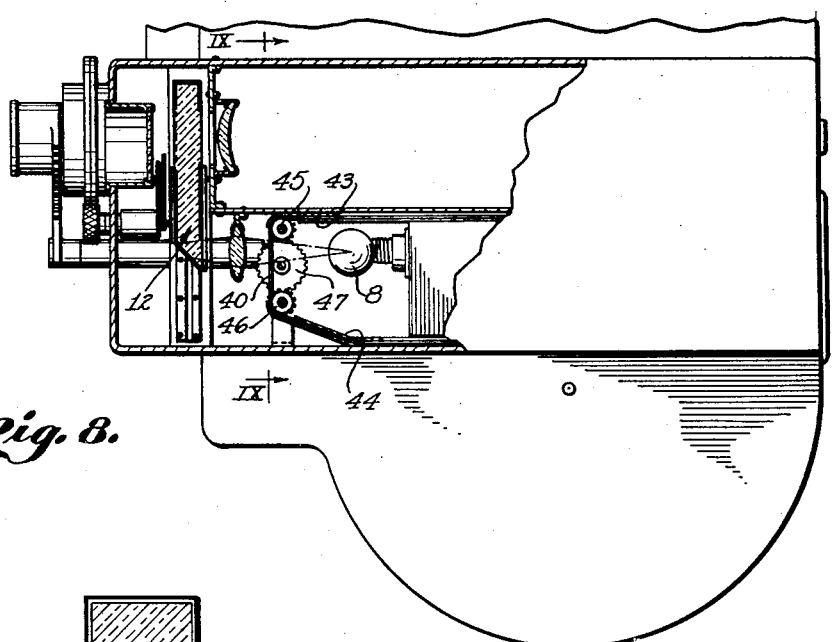
Fig. 8.
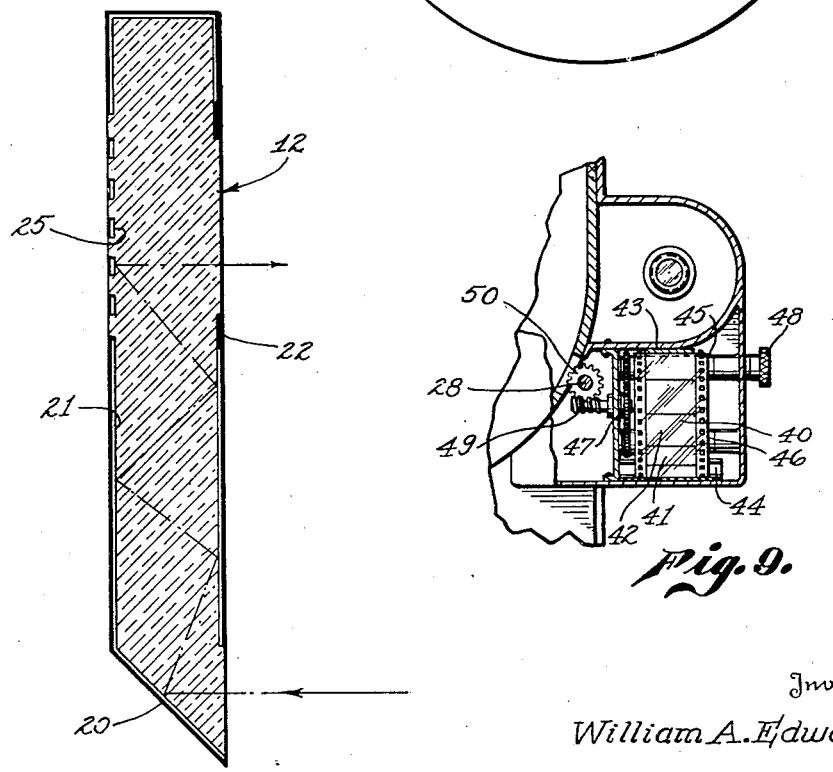
Fig. 7.
Fig. 9.
Inventor
William A. Edwards
By Lyon & Lyon
Attorneys Patented Jan. 7, 1936

2,026,675

UNITED STATES PATENT OFFICE 2,026,675

METHOD AND APPARATUS FOR CONTROLLING PHOTOGRAPHIC EXPOSURES

William A. Edwards, Santa Barbara, Calif.

Application April 2, 1935, Serial No. 14,247

11 Claims. (Cl. 95—64)

This invention relates to a method of controlling the photographic exposure given an emulsion, either by means of adjustably positioning the diaphragm or the timing mechanism, such control being automatically performed in accordance with the luminosity of an object or portion of the total scene being photographed. The invention also relates to means whereby the above method may be readily and accurately performed.

In order to obtain a photographic image of a given object, said image having a desired density or degree of contrast, it is necessary that the time of exposure used or the numerical opening (iris opening) employed during photography be properly selected and correlated with respect to the light reflective or luminous characteristics of the object. The object which is being photographed may have luminous characteristics differing widely from those of adjacent objects or of the background of the scene. In photographing under such conditions the general or average illumination of the entire scene does not impart the desired data and cannot be used satisfactorily in estimating the degree of exposure necessary for the production of a suitable image of the single object. The present invention provides means whereby the iris, stop or timing means of the camera may be automatically adjusted in accordance with the luminosity or brilliance of a single object in a scene.

The mode of operation embraced by this invention, with particular reference to actual photography, comprises variably illuminating a reflective member positioned in the line of sight with an object, whereby the luminosity of said reflective member may be caused to approximate the luminosity of the object and then simultaneously or automatically adjustably regulating either the aperture of the camera or the timing mechanism in inverse ratio to the quantity of illumination required to produce such approximately equal luminosity of the object and reflective member.

The apparatus used in carrying out this method may include a finder and a cell transversely positioned in the line of sight of said finder, said cell being substantially transparent throughout the effective area in the line of sight and internally reflective at all other points. Means are also provided for admitting regulatable light into one end of said cell, this light tending to illuminate opaque but light reflective members or areas positioned within the effective area of said cell. Means are also provided whereby the camera diaphragm or iris is automatically and adjustably varied in inverse ratio to the amount of light admitted into the cell.

An object of this invention therefore is to disclose and provide a method for automatically controlling the degree of exposure imparted to a film in accordance with the luminosity or brilliance of any particular object or portion of a scene being photographed.

Another object is to disclose and provide means whereby the amount of exposure imparted to a film during photography may be automatically controlled in accordance with the degree of luminosity or brilliance of a particular or desired portion of the scene.

These and other objects, uses, advantages and adaptations of the invention will become obvious to those skilled in the art from a contemplation of the following detailed description of a preferred illustrative form of the invention and from the use of the device and methods herein described. In order to facilitate understanding of the invention, reference will be had to the appended drawings, in which Fig. 1 is a front elevation, partly diagrammatic, of a portable motion picture camera provided with means whereby the method of this invention may be placed in operation;

Fig. 2 is a vertical section taken along the plane II—II of Fig. 1;

Fig. 3 is a diagrammatic representation of the electrical connections which may be used;

Fig. 4 is a transverse vertical section taken along the plane IV—IV of Fig. 2;

Fig. 5 is a horizontal section taken along the plane V—V of Fig. 4;

Fig. 6 is a transverse vertical section taken along the plane VI—VI of Fig. 2;

Fig. 7 is an enlarged, partly diagrammatic representation of a preferred form of cell;

Fig. 8 is a side elevation, partly in section, of a modified form of device; and Fig. 9 is a transverse section taken generally along the plane IX—IX of Fig. 8.

Although the form of invention described herein for purposes of illustration shows the method and apparatus applied to a camera, it is to be understood that the method and apparatus may also be employed in printing as well as in photographing operations.

As shown in the drawings, a portable motion picture camera, generally indicated at 1, and provided with a main lens diaphragm or iris 2, is provided with a finder case 3 operatively connected to the main housing of the motion picture camera. This finder case 3 includes an eyepiece 4, a lens 5 and a suitable hooded aperture or sunshade 6, which may have a window 7 therein. The field of view of this finder is indicated by dotted lines in Fig. 2. The lower portion of the finder case 3 may include a source of light, such as the incandescent filament bulb 8 operatively connected to a battery 9, said battery and lamp being removably positioned within the housing 3. Vertically arranged guides 10 and 11 within the case 3 receive a cell, generally indicated at 12. The cell may carry metallic frame members 13 and 14 which cooperate with the vertical guides 10 and 11, respectively. The frame member 14 may be provided with a rack gear along one edge, this rack engaging with a spur gear 15 mounted upon a shaft provided with the knob 16. Rotation of the knob will obviously cause the cell 12 to rise or fall, thereby permitting the upper portion of the cell to be brought within the field of view of the finder when desired. The field of view is indicated by the line 17 in Fig. 4.

A switch 18 is carried by the case 3 adjacent the guide 11 and a contact member 19 protrudes from the frame 14 in such manner as to open the switch 18 when the cell 12 is in lowered position. The switch 18 is operatively connected to the electrical circuit forming a part of this device, as shown by Fig. 3.

The cell 12 may comprise a solid block of glass of appreciable thickness extending transversely across the line of sight of the finder. The cell 12 may be provided with a beveled lower edge 20 adapted to receive light from the source 8 and reflect it upwardly into the body of the cell. This edge 20 may be made externally concave to facilitate dispersion of entering light. The internal surfaces of the cell 12 may be reflective, as indicated at 21, with the exception of the area 17 representing the field of view. Sections adjoining the field of view 17 may be rendered non-reflective, as indicated at 22. The upper end of the cell 12 may be curved, as indicated at 23, and the side edges may be indented or serrated, as indicated at 24, for the purpose of facilitating the reflection of light from the inclined surface 20 onto the light reflective portions or lines 25 formed in the anterior surface of the cell 12. These lines or points 25 are within the field of view and may be formed by placing a reflective white substance within grooves or depressions formed in the front face of the cell, such reflective substance being opaque or covered with a non-reflective opaque material, as indicated in Fig. 7.

Light from the source 8 is directed upon the reflective beveled edge 20 of the cell 12 by means of a lens 26. The amount of light transmitted by such lens into the cell may be regulated by means of a diaphragm or iris 27. This iris or diaphragm 27 is geared as shown in Fig. 6 to a longitudinally extending shaft 28 through a gear 29. The shaft 28 is provided at its forward end with a cam gear 30 engaging a similar cam gear 31 operatively connected to the iris or diaphragm 2 of the main optical system of the camera. Partial rotation of the shaft 28 will therefore cause the iris 27 to open or close similarly and proportionately effecting the iris 2 of the camera but in inverse ratio.

Generally stated, the operation of the device described comprises raising the cell 12 into the position shown in Fig. 2 by operation of the knob 16, thereby closing the switch 18 and energizing the source of light 8. Movement of the shaft 28 then causes a variation in the amount of light transmitted by the source 8 into the cell. When the luminosity of the members 25 is substantially equivalent to the luminosity of a particular object viewed through the finder 3 so that the observer canot readily distinguish between the bars, lines or points 25 and the particular object which it is desired to photograph, then the iris 27 has been suitably adjusted and simultaneous but partial rotation of the shaft 28 has caused the iris 2 of the camera to be proportionately opened or closed so that at the given or fixed speed at which the shutter of the camera operates a suitable exposure of the film is attained. When the luminosity of the members 25 approximates that of the particular object which it is desired to photograph, then the operator is assured that the iris 2 of the camera is in its required position.

In order to insure the provision of a standardized light in the apparatus, a voltmeter provided with a needle 33 and a dial 34 is included in the electrical circuit. A variable resistance 35 operated by means of the knob 36 is also provided. The dial 34 may be adjustably positioned so that when the needle 33 indicates that a proper voltage is flowing through the filament of the light source 8 said needle is visible within the field of view of the finder. It is to be understood that the quantity of lumens radiated by an incandescent filament varies with the temperature of the filament and the voltage impressed thereon. In this manner the intensity of the light source with a given aperture opening (either minimum or maximum) can be readily checked and controlled.

The construction and operation of the device described hereinabove will be readily apparent to those skilled in the art. The modification illustrated in Figs. 8 and 9 contemplates the introduction of a strip of film 40 bearing frames of differing intensity, such as the frames 41 and 42, between the light source 8 and the cell 12. Various portions or frame areas of the strip of film 40 may vary from substantial transparency to areas which are practically opaque, thereby permitting the selective introduction of light modulating means of predetermined or regulatable character. Said strip of film 40 may be guidably retained within guides 43 and 44 which bring the strip of film in contact with sprockets 45 and 46. The sprockets 45 and 46 may be geared to one another by means of an intermediate gear 47. The shaft on which one of said sprockets is mounted may be provided with a knob 48. A part of this system or the same shaft may be provided with a worm 49 in engagement with spiral gear 50 mounted upon the shaft 28 which, as in the previously described form, is then mechanically interlocked with the iris of the camera. It will be obvious that the strip of film 40 performs substantially the same function, as far as modulation or regulation of the light passing into the cell 12 is concerned, as the iris 27 shown in Fig. 1.

Moreover it is to be understood that in the event cameras are provided with an adjustable timing device the shaft 28 or its counterpart may be mechanically interlocked with such timing device so as to vary the time of exposure instead of the aperture. Instead of using the strip of film, such as the film 40, a wedge-shaped or graduated filter may be used, said filter being geared or otherwise connected to the exposure controlling means of the camera.

It is to be remembered that in use the purpose of the device is to permit the operator to approximate the luminosity, brilliance or light reflective properties of a particular object which he desires to photograph by modulating the light admitted into the cell 12 until the members 25 exhibit approximately the same luminosity or brilliance as the object. This condition is obtained by manipulation of the light modulating means (such as the iris 27 or the film 40). The aperture or the timing means of the camera will automatically be of the required value.

Means may be provided for releasing gear 30 from engagement with the gear 31 of the iris 2 whenever it is desired to change lenses or diaphragms. It is to be understood that numerous mechanical modifications may be made in the device shown. The precise arrangement of parts will also vary with the type of camera or other photographic apparatus with which it is desired to use the invention. The general arrangement and mode of operation will be evident from the above example. The voltmeter and resistance may be made a part of the removable battery case 9, the said voltmeter being positioned on the rear closure plate 50 of the device. By positioning the voltmeter and scale at the front of the viewing device, the voltmeter reading is kept within the field of view while the light is being further modulated and the camera exposure is being automatically varied, thereby obviating errors which may arise due to an unforeseen failure of the light source. Moreover the intensity of the light supplied to the cell 12 may be further modulated and controlled by moving the entire battery case 9, including the light source 8, longitudinally within the housing 3 whenever such refinement is deemed necessary in the standardization of the light.

The substantially opaque but reflective members or portions 25 described hereinabove and shown on the drawings as horizontally extending stripes or bars may take the form of rounded grooves made in the front face of the cell 12 or may consist of suitably shaped points, squares or circular areas rendered internally light reflective by the application of a suitable white or other light colored paint, enamel or other composition.

Instead of using an artificial source of light, such as the bulb 8, light may be reflected from the sky, by means of prisms or mirrors, and this light then passed through a modulating means into the cell. In standardizing such device a small portion of the light passing through the modulating device (iris, filter or the like), when said device is in a predetermined position, can be diverted onto a photoelectric or selenium cell. The energy reading of such cell can then be caused to become a given, predetermined quantity, when the camera iris (or time of exposure) is at maximum, minimum, or other predetermined position by adjusting the light modulating means while the interlock between such modulating means and camera is held open. After the desired or standard energy reading is obtained, the controlling device and camera are interlocked, whereupon the device will automatically function to control the exposure as hereinbefore described.

In addition, a suitable color filter may be interposed in the path of light from the source 8 and the cell to compensate for undue proportion of red or other rays omitted by such source, although ordinarily such filters are not necessary.

Although the description given hereinabove particularly relates to the adaptation of the invention to a motion picture camera, similar arrangements and combinations may be adapted to still cameras, printers and the like. All changes, modifications, adaptations and uses coming within the scope of the appended claims are embraced thereby.

I claim:

1. The method of controlling the exposure of a photographic emulsion in accordance with the luminosity of an object in a scene to be photographed, which comprises: variably illuminating a reflective member with light from a controllable source other than the scene to be photographed, said reflective member being positioned in the line of sight of an object whereby the luminosity of said reflective member in the said line of sight may be caused to visibly approximate the luminosity of the object, and controlling the exposure given a photographic film on which said scene is to be photographed in accordance with the variation in illumination used on said reflective member.

2. The method of controlling the exposure of a photographic emulsion in accordance with the luminosity of an object in a scene to be photographed, which comprises: variably illuminating a reflective member with light from a controllable source other than the scene to be photographed, said reflective member being positioned in the line of sight of an object whereby the luminosity of said reflective member in the said line of sight may be caused to visibly approximate the luminosity of the object, and regulating the numerical aperture of the camera in inverse ratio to the quantity of illumination required to produce such approximation of luminosity between said reflective member and the object.

3. In a device of the character described, the combination of a viewing means including an eyepiece, a cell positioned in said viewing means and extending beyond the effective optical transverse area of said viewing means, said cell being substantially transparent at said effective area and internally reflective at other portions, opaque portions adapted to reflect light towards the eye-piece of said viewing means carried by said cell in the effective, substantially transverse area of said cell, and means for admitting regulatable quantities of light into one end of said cell whereby the luminosity of said opaque reflective portions may be varied.

4. In a device of the character described, the combination of a viewing means including an eyepiece; a glass cell transversely positioned within said viewing means, said cell extending beyond the effective optical transverse area of said viewing means, said cell being substantially transparent at said effective area and internally reflective at other portions; opaque portions adapted to reflect light toward the eye-piece of said viewing means carried by said cell in the effective, substantially transparent area of said cell, a light admitting port adjacent one end of the cell, and means for admitting regulatable quantities of light into said cell through said port.

5. In a device of the character described, the combination of a viewing means including an eyepiece; a glass cell transversely positioned within said viewing means, said cell extending beyond the effective optical transverse area of said viewing means, said cell being substantially transparent at said effective area and internally reflective at other portions; opaque portions adapted to reflect light toward the eye-piece of said viewing means carried by said cell in the effective, substantially transparent area of said cell, a light admitting port adjacent one end of the cell, a standard light source, means for directing light from said source through said port into said cell, and means for modulating the quantity of light so admitted.

6. In a device of the character described the combination of a viewing means including an eye-piece; a glass cell transversely positioned within said viewing means, said cell extending beyond the effective optical transverse area of said viewing means, said cell being substantially transparent at said effective area and internally reflective at other portions; opaque portions adapted to reflect light toward the eye-piece of said viewing means carried by said cell in the effective, substantially transparent area of said cell, a light admitting port adjacent one end of the cell, a standard light source, means for directing light from said source through said port into said cell, means for modulating the quantity of light so admitted, a camera provided with an adjustable diaphragm, and means connecting said camera diaphragm with said light modulating means whereby said diaphragm may be adjustably positioned by adjustment of said light modulating means.

7. In a device of the character described, the combination of: a viewing means including an eye-piece; a cell transversely positioned in said viewing means; means for adjustably moving said cell into and out of the line of sight of said viewing means, said cell being substantially transparent throughout an area equivalent to the effective viewing area of said viewing means and internally reflective at substantially all other portions; port means for admitting light into one end of said cell, and substantially opaque portions adapted to reflect light toward the eye-piece of said viewing means carried in the effective, substantially transparent area of said cell.

8. In a device of the character described, the combination of: a viewing means including an eye-piece; a cell transversely positioned in said viewing means; means for adjustably moving said cell into and out of the line of sight of said viewing means, said cell being substantially transparent throughout an area equivalent to the effective viewing area of said viewing means and internally reflective at other portions; port means for admitting light into one end of said cell, substantially opaque portions adapted to reflect light toward the eye-piece of said viewing means carried in the effective, substantially transparent area of said cell, and means for admitting regulatable quantities of light into said cell through said port.

9. In a device of the character described, the combination of: a viewing means including an eye-piece; a cell transversely positioned in said viewing means; means for adjustably moving said cell into and out of the line of sight of said viewing means, said cell being substantially transparent throughout an area equivalent to the effective viewing area of said viewing means and internally reflective at other portions; port means for admitting light into one end of said cell, substantially opaque portions adapted to reflect light toward the eye-piece of said viewing means carried in the effective, substantially transparent area of said cell, and means for admitting regulatable quantities of light into said cell through said port, said means including a light source and light modulating means between said source and said port.

10. A device of the character described in claim 8, including means for energizing said regulatable light means when said cell is raised into operative position within said viewing means.

11. A device of the character described in claim 9, including means for energizing said light source when said cell is raised into operative position within said viewing means.

WILLIAM A. EDWARDS.